(12) United States Patent
Philipps

(10) Patent No.: US 8,522,625 B2
(45) Date of Patent: Sep. 3, 2013

(54) FLOW MEASURING APPARATUS INCLUDING A DEFLECTABLE MEMBRANE APPLIED TO A CONSTRICTION

(75) Inventor: Michael Philipps, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 408 days.

(21) Appl. No.: 12/923,701

(22) Filed: Oct. 5, 2010

(65) Prior Publication Data
US 2011/0083515 A1   Apr. 14, 2011

(30) Foreign Application Priority Data
Oct. 6, 2009   (DE) .......................... 10 2009 045 372

(51) Int. Cl.
*G01F 1/37* (2006.01)
(52) U.S. Cl.
USPC ..................................... 73/861.52; 73/861.47
(58) Field of Classification Search
None
See application file for complete search history.

(56) References Cited

U.S. PATENT DOCUMENTS

| 5,869,772 A | 2/1999 | Storer |
| 6,959,607 B2 | 11/2005 | Wilda |
| 7,464,721 B2 | 12/2008 | Perry |
| 2002/0029130 A1 | 3/2002 | Eryurek |
| 2009/0000393 A1 * | 1/2009 | Nyfors et al. ............... 73/861.19 |

FOREIGN PATENT DOCUMENTS

| DE | 10 2005 055 285 A1 | 5/2007 |
| WO | WO 2008/061551 A1 | 5/2008 |

* cited by examiner

*Primary Examiner* — Harshad R Patel
(74) *Attorney, Agent, or Firm* — Bacon & Thomas, PLLC

(57) ABSTRACT

A flow measuring arrangement for measuring flow through a measuring tube comprises at least one constriction located in the measuring tube, which effects a reduction of a volume through which a medium flows; at least one deflectable membrane applied to said constriction, wherein deflection of the membrane effects a change of a volume through which medium flows in the measuring tube; a pressure measuring system connected to the measuring tube for measuring pressure ($\Delta p$, p); measuring electronics, which determines flow based on the measured pressure ($\Delta p$, p); an apparatus for producing a time variable deflection of the membrane and a diagnostic system, which determines an affect of said deflections of the membrane on the measured pressure ($\Delta p$, p), and which diagnoses the flow measuring arrangement based on the deflections and determined effects thereof on the measured pressure ($\Delta p$, p).

17 Claims, 9 Drawing Sheets

FLOW MEASURING APPARATUS INCLUDING A DEFLECTABLE MEMBRANE APPLIED TO A CONSTRICTION

TECHNICAL FIELD

The invention relates to a flow measuring arrangement for measuring flow of a medium through a measuring tube. The flow measuring device includes: a constriction located in the measuring tube and connected to the measuring tube for effecting a volume reduction of the medium flowing through the measuring tube and thus a change of pressure conditions internally in the measuring tube dependent on the dimensions of the constriction and the flow; a pressure measuring system, which serves to measure a pressure dependent on flow through the measuring tube and dependent on the dimensions of the constriction; and measuring electronics, which determines flow on the basis of the measured pressure. The invention also relates to a method for monitoring the functioning of the flow measuring arrangement.

BACKGROUND DISCUSSION

Flow measuring arrangements measuring the flow of a medium through a measuring tube on the basis of pressure- or pressure difference measurements are applied in a large number of industrial plants, as well as in the water- and waste water industries.

For this, there are essentially two different measuring principles applied. These are the differential pressure method and the vortex-method.

In the case of the differential pressure method, the effect discovered by Daniel Bernoulli is used, according to which a constriction in a pipeline effects, dependent on flow through the pipe, a pressure difference between static pressure reigning in the measuring tube, in the direction of flow of the medium, before the constriction and after the constriction. The constriction is formed, for example, by apertures, orifices, nozzles, Venturi nozzles or Venturi tubes inserted into the measuring tube, and increases the flow velocity of the medium in this area, with an accompanying increase in the dynamic pressure. The flow through the measuring tube is proportional to the square root of the resulting pressure difference, which is referred to as the differential pressure. The differential pressure is measured by a pressure difference measuring transducer, which is connected to the measuring tube via a first pressure line before the constriction, and via a second pressure line after the constriction.

In the case of the vortex method, a bluff body is inserted into the measuring tube. The medium flows around the bluff body. Vortices are shed from the bluff body into the region behind the bluff body with a frequency dependent on the dimensions of the bluff body and dependent on the flow. These vortices, also known as Karman vortices, cause pressure fluctuations in the flow behind the bluff body in the measuring tube. These pressure fluctuations are recorded by a pressure measuring transducer, which measures the pressure at a location in the measuring tube downstream from the bluff body. The frequency of the shedding of vortices is reflected in the frequency of the changes in the measured pressure as a function of time. The frequency is derived on the basis of the measured pressure, and, from this, flow is determined.

In order to assure secure and reliable measurement of flow over very long periods of use, it is desirable that the measuring equipment be subjected to functionality testing sporadically, regularly, or as needed. In such case, users desire an automatic functionality check, in which the measuring arrangement is able to check its functional ability automatically without significantly changing flow-through the measuring tube.

In US 2002/0029130 A1, a diagnostic method for flow measuring systems using the differential pressure method is described. In this case, the difference between the currently measured pressure differential and the sliding average of the measured pressure differential is determined continuously. The statistical quantities of these differences, e.g. their average value and their standard deviation, are determined, and, from these, deductions on the state of the pressure supply lines in the measuring tube for the pressure difference measuring device can be derived. In such case, these statistical variables are compared with historical reference data. If this comparison registers a deviation from the reference data exceeding a predetermined threshold value, then, for example, an obstruction of the pressure supply lines has been detected.

In parallel therewith, or alternatively thereto, a spectral energy density of these differences is determined. Deviations of the spectral energy densities from historical reference data permit deductions on the state of the constriction effecting the pressure difference in the pipeline.

In DE 10 2005 055 285 A1, a diagnostic method for a pressure measuring transducer is described, in which the pressure to be measured externally acts on an isolating diaphragm and is transmitted via a hydraulic path integrated in the measuring transducer to a pressure sensor that measures this pressure. There, pressure fluctuations are impressed on the hydraulic path for the diagnosis; these pressure fluctuations are reflected in the measurement signal of the pressure sensor. For example, abrasion, corrosion, or accretion formation on the isolating diaphragm can be recognized on the basis of the effects of the pressure fluctuations on the measurement signal.

In U.S. Pat. No. 7,255,012 B2, a flow measuring arrangement is described, which has, installed in the measuring tube, an iris-type diaphragm with an adjustable aperture. The diaphragm serves as a valve, via which the desired flow through the measuring tube is set. For this purpose, the differential pressure falling across the diaphragm is measured and, from that, flow is determined. The measured flow is used in a feedback loop in such a manner as to set the opening of the diaphragm so that the desired flow is present.

Moreover, a diagnostic method for this flow measuring arrangement is described, in the case of which the size of the aperture of the diaphragm is changed for an instant, and the change of the measured pressure difference associated therewith is measured.

Since the diaphragm is used as a valve here, the system is relatively slow-acting and is unsuitable, for example, for bringing about fast, periodic changes in the size of the aperture. Moreover, large changes to aperture size effect a marked change of the flow.

SUMMARY OF THE INVENTION

It is an object of the invention to provide a flow measuring system, which can automatically monitor its functional ability, while degrading flow through a measuring tube as little as possible.

To this end, the invention resides in a flow measuring arrangement for measuring flow of a medium through a measuring tube, including:
at least one constriction located in the measuring tube, which effects a reduction of a volume through which the medium flows internally in the measuring tube, and therewith a change in pressure conditions internally in the measuring tube, dependent on dimensions of the constriction and dependent on flow;

a pressure measuring system connected to the measuring tube, which serves to measure a pressure dependent on flow through the measuring tube and dependent on the dimensions of the constriction;

measuring electronics, which determines flow on the basis of measured pressure and the dimensions of the constriction;

at least one deflectable membrane applied to one of the measuring tube constrictions internally in the measuring tube, wherein deflection of the membrane effects a change, dependent on an amplitude of the deflection, of a volume through which medium flows internally in the measuring tube;

an apparatus for producing a time variable deflection of the membrane according to a predetermined time-dependent deflection profile; and, a diagnostic system connected to the apparatus and to the pressure measuring system, which determines at least one effect of time-dependent changes of deflection of the membrane on the measured pressure, and which produces a diagnosis of the functional ability of the flow measurement arrangement based on the predetermined time-dependent deflection profile and the effects, as determined by the diagnostic system, of associated time-dependent changes of the deflection of the membrane on the measured pressure.

According to a first embodiment, the measured pressure is a differential pressure, which is equal to a difference between, in the flow direction, a static pressure reigning in the measuring tube before the constriction and a static pressure reigning in the measuring tube after the constriction; and for measuring the differential pressure, the pressure measuring system is a pressure difference transducer;

to which the static pressure reigning before the constriction is fed via a pressure supply line connected to the measuring tube before the constriction; and to which the static pressure reigning after the constriction is fed via a pressure supply line connected to the measuring tube after the constriction.

Additionally, the invention includes a further development of the first embodiment, in which the constriction is formed by, inserted into the measuring tube, a diaphragm, on whose lateral surface facing into the interior of the measuring tube, the membrane is applied. Alternatively, a diaphragm that has a plurality of openings can also be used, where the deflectable membrane is applied on at least one inner lateral surface of one of the openings.

Additionally, the invention includes a further development of the first embodiment, in the case of which the constriction is formed by, inserted into the measuring tube, a nozzle which has, located in the measuring tube, a tubular segment, whose diameter is smaller than the diameter of the measuring tube, and the membrane is arranged on an inner lateral surface of the tubular segment.

Additionally, the invention includes a further development of the first embodiment, in the case of which the measuring tube has a tube segment formed as a Venturi tube or a Venturi nozzle, and the constriction is formed by a section of this tube segment having a reduced diameter compared to the measuring tube diameter.

In a second embodiment, the constriction is formed by a bluff body installed in the measuring tube. The medium flows around the bluff body. Vortices are shed from the bluff body into the region behind the bluff body with a frequency dependent on the dimensions of the bluff body and dependent on the flow. Here, the pressure measuring system includes a pressure measuring transducer, which measures a pressure acting at a measuring location situated in the measuring tube, in the direction of flow, behind the bluff body. This pressure varies in time as a function of the vortices flowing past, and the measuring electronics determines flow based on this time-dependent, measured pressure. In this variant, the membrane is applied to an outer, lateral surface of the bluff body.

In an development of the second embodiment, the pressure measuring transducer is a capacitive measuring transducer, including:

a paddle-shaped sensor blade, one end of which protrudes into the measuring tube behind the bluff body and is moved to and fro perpendicularly to the longitudinal axis of the measuring tube by pressure fluctuations caused by the vortices, and an opposite end of which performs opposite-equal movements and forms an electrode of one or more capacitors; and measuring electronics connected to the capacitor(s) for measuring movements of the electrode in the form of capacitance changes proportional to vortex pressure difference.

In a further development of the second embodiment, each of two oppositely lying, outer, lateral surfaces of the bluff body has a membrane applied thereto.

Additionally, the invention includes a first further development, in the case of which:

a chamber filled with an incompressible medium is located under the membrane; and the apparatus is a hydraulic apparatus connected to the chamber for effecting deflection of the membrane via supply, respectively, removal, of the incompressible medium.

Additionally, the invention includes a second further development, in the case of which:

a chamber filled with an incompressible medium is located under the membrane; and the apparatus comprises a fill element arranged in the chamber or in a hollow space connected to the chamber and having an electrically adjustable fill element volume, especially the fill element is a piezoelectric or magnetostrictive element.

Additionally, the invention includes a first method for function monitoring of a flow measuring system of the invention, wherein the diagnostic system compares its determined effects of time-dependent change of deflection of the membrane on measured pressure with corresponding reference effects occurring in a properly working flow measuring arrangement at equal, predetermined deflection profile, and creates the diagnosis of the functional ability of the flow measuring arrangement on the basis of this comparison.

Additionally, the invention includes a second method for function monitoring of the flow measuring system according to the first embodiment, wherein:

the apparatus oscillates the membrane sporadically, regularly, depending on need or permanently and oscillation frequency is large compared to a rate of change of flow;

the diagnostic system determines at the least one effect on measured pressure brought about by oscillation of the membrane;

compares the effects with corresponding reference effects occurring in a properly working flow measuring arrangement; and generates a diagnosis of the functional ability of the flow measuring system based on these comparisons.

Additionally, the invention includes a third method for function monitoring of a flow measuring system according to the second embodiment, wherein:

the apparatus oscillates the membrane sporadically, regularly, depending on need or permanently and oscillation frequency is large compared to a rate of change of flow and large compared to a frequency of shedding of vortices behind the bluff body;

the diagnostic system determines at the least one effect on measured pressure brought about by oscillation of the membrane;

compares the effects with corresponding reference effects occurring in a properly working flow measuring arrangement; and generates a diagnosis of the functional ability of the flow measuring system based on these comparisons.

In an embodiment of the second or third method, deviations from the reference results are determined as they occur, and the diagnosis is output as a report of full functional ability, a small degrading, a warning, an error report or an alarm, depending on degree of the deviations.

In a further embodiment of the second or third method, the effects are an amplitude, a phase shift relative to the oscillation of the membrane and/or a frequency of the changes of measured pressure caused by oscillation of the membrane.

In a further development of the second method, while the membrane oscillates, flow through the measuring tube is determined on the basis of an average value of the measured differential pressure averaged over at least one period of the oscillation of the membrane.

An advantage of the invention is that very slight deflections of the membrane, especially deflections of a few millimeters, suffice for reliable function monitoring, and the flow is only insignificantly degraded, so that the self-diagnosis can be executed in parallel with flow measurement.

A further advantage of the invention is that the membrane can be excited by the apparatus to very fast oscillations of small amplitude. In this way, the average value of the flow-dependent, measured pressure remains unchanged. The diagnosis leads, in this case, to no degrading of the accuracy of the flow measurement.

A further advantage is that, via the predetermined, time-dependent deflection profile at the constriction and, therewith, immediately at the beginning of the total measuring chain, a known signal is actively fed in, which is transmitted through the entire measuring chain from the constriction to the output of the pressure measuring system. Therewith, the entire measuring chain can be monitored in simple manner. When the signal fed into the beginning of the measuring chain can no longer be detected at the output of the measuring chain, then an error exists within the measuring chain. Typical errors are e.g. a slow plugging of the pressure lines as well as mechanical and/or electronic malfunctions of the pressure measuring mechanisms.

BRIEF DESCRIPTION OF THE DRAWINGS

The invention and other advantages will now be explained in greater detail based on the figures of the drawing, in which seven examples of embodiments are presented. Equal parts are marked in the figures with equal reference characters. The figures of the drawing show as follows.

DETAILED DISCUSSION IN CONJUNCTION WITH THE DRAWINGS

Figure 1:
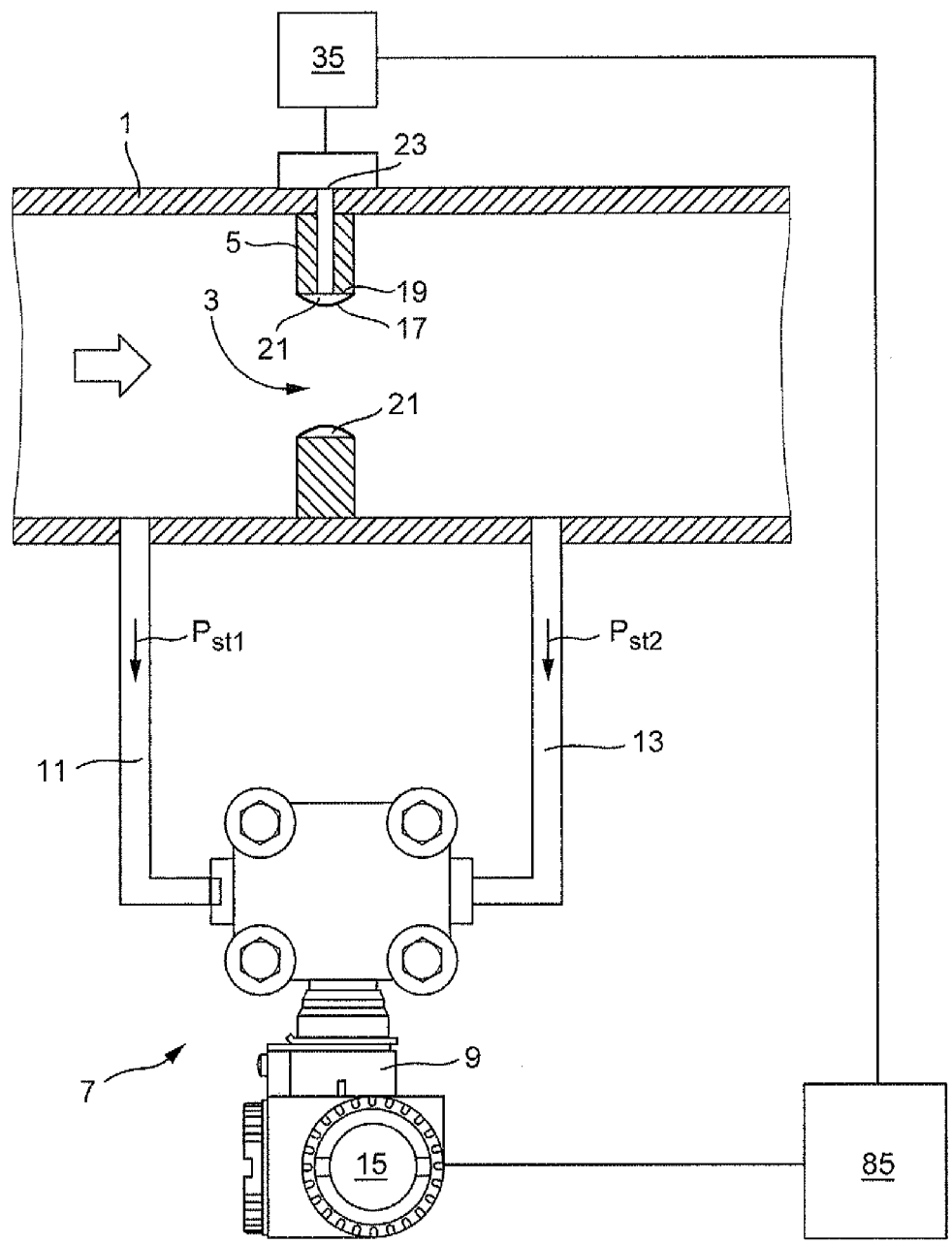
FIG. 1 is a schematic drawing of a flow measuring arrangement of the invention working according to the differential pressure method.

FIG. 1 shows a schematic representation of a flow measuring arrangement of the invention. This includes a measuring tube 1 that the medium flows through during measurement operation. The flow direction is indicated in FIG. 1 by the two large arrows. The arrangement serves to measure flow of the medium through the measuring tube 1.

For this, a constriction 3 is located in the measuring tube 1, which effects, in the region of the constriction, a reduction of the volume through which the medium flows internally in the measuring tube 1. The constriction 3 causes a change of the flow profile of the medium in the measuring tube 1, in order to effect a change of the pressure conditions internally in the measuring tube 1 dependent on the dimensions of the constriction 3 and dependent on the flow rate of the medium. Depending on measuring principle used, quite different types of constrictions, e.g. orifices, nozzles or bluff bodies, can be applied.

The variant illustrated in FIG. 1 involves a flow measuring arrangement using the differential pressure method. Here the constriction 3 is formed by a washer-shaped diaphragm 5 installed in the measuring tube 1. Diaphragm 5 reduces the cross section through which the medium flows internally in the measuring tube 1.

Figure 1A:
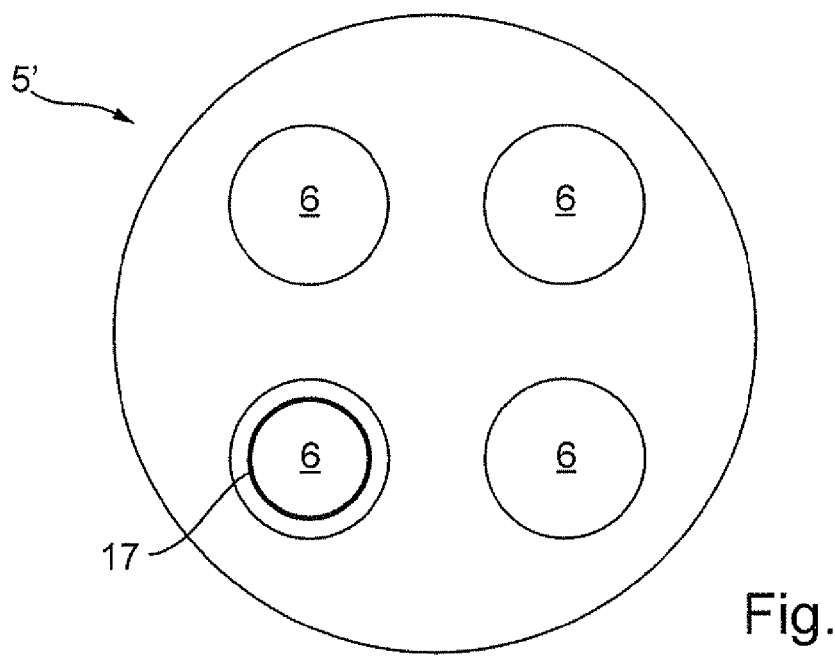
FIG. 1a shows a diaphragm with a plurality of openings.

Naturally, other orifice forms can be applied instead of the annular washer shaped diaphragm 5. FIG. 1a shows a view of a disk shaped diaphragm 5' with a plurality of openings 6 as an example of an alternative.

The pressure measuring system comprises a pressure measuring system 7 connected to the measuring tube for measuring the pressure, which is dependent on the flow through the measuring tube 1 and dependent on the dimensions of the constriction 3. The pressure measured here is a differential pressure $\Delta p$, which, in the direction of the flow, equals the difference between the static pressure $p_{st1}$ reigning in the measuring tube 1 before the constriction 3 and the static pressure $p_{st2}$ reigning in the measuring tube 1 after the constriction 3. For measuring the differential pressure $\Delta p$, the pressure measuring system 7 includes a pressure difference sensor 9, to which the pressure $\Delta_{sr1}$ reigning before the constriction 3 is supplied through a first pressure line 11 connected to the measuring tube 1 before the constriction 3, and to which the pressure $p_{sr2}$ reigning after the constriction 3 is supplied through a second pressure line 13 connected to the measuring tube 1 after the constriction 3.

Measuring electronics 15 is provided, which, on the basis of the measured pressure, here the differential pressure $\Delta p$, and the dimensions of the constriction 3, determines flow. This flow measurement is based on the classic differential pressure method described above. The measuring electronics 15 is presented here as an example integrated in the housing of the pressure difference measuring transducer 9.

In accordance with the invention, the flow measuring arrangement includes a membrane 17 applied on the constriction 3 internally in the measuring tube 1. Membrane 17 is deflectable inwardly into the measuring tube 1. Membrane 17 is composed of an elastic material, such as e.g. a stainless steel, resistant to the medium. Basically, all materials which are currently usually used for isolating diaphragms of pressure- or pressure-difference measuring transducers are suitable for this.

In the case of the variant illustrated in FIG. 1, membrane 17 is applied to a cylindrical, lateral surface 19 of the annular washer shaped diaphragm 5 facing radially inwardly into the measuring tube 1. Membrane 17 forms a closed ring whose two circularly shaped outer edges are connected to the outer edges of the lateral surface 19. Membrane 17 and the lateral surface 19 enclose a sealed chamber 21.

In the case of the variant illustrated in FIG. 1a, membrane 17 is analogously applied to a cylindrical lateral surface of one of the openings 6 of the diaphragm 5' facing inwardly into the interior of the measuring tube 1. Alternatively, a plurality, or even all, of the openings 6 can be equipped with membranes 17.

Figure 1B:
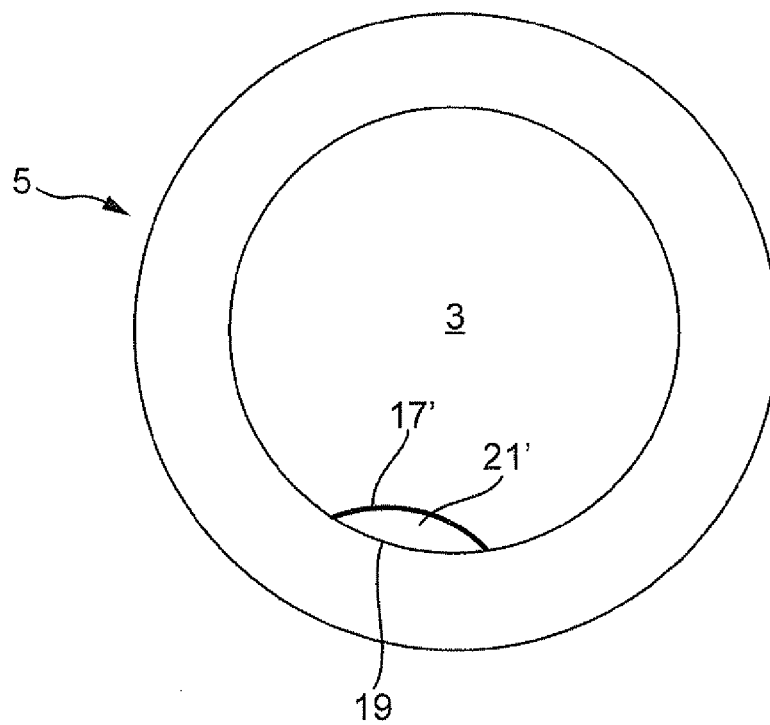
FIG. 1b shows a membrane inserted into the diaphragm, wherein the membrane has enclosed thereunder a chamber, which covers only a section of the lateral surface of the diaphragm opening.

As an alternative to the described membranes 17 in the form of a surface closed into a ring shape, other membrane forms can also be applied. FIG. 1b shows an example of this. Here, the membrane 17 covers only a section of the cylindrical lateral surface 19 of the annular washer-shaped diaphragm 5 facing inwardly into the measuring tube 1. Here also the outer edge of the membrane 17' is again fixedly connected with the lateral surface, and the section of the lateral surface 19 surrounded by the membrane 17' encloses a sealed chamber 21'. Since the membrane 17' covers only a section of the lateral surface 19, a plurality of synchronously deflectable membranes 17' can also be arranged on the lateral surface 19, preferably distributed symmetrically, and each enclosing a sealed chamber 21'.

This membrane form can naturally be used in the same manner in the openings 6 of the diaphragm 5' illustrated in FIG. 1a.

The invention will now be explained further using the example of the membrane 17. However, the explanation applies completely analogously to the membrane 17', shown in FIG. 1b, which can be applied instead of the annular membrane 17 in all working examples of the implementation of the differential pressure method.

Deflection of the membrane 17 effects a change of the volume through which the medium flows internally in the measuring tube 1. This change depends on the amplitude of the deflection. A change of the deflection of the membrane 17 immediately affects the measured pressure, here the differential pressure $\Delta p$. In such case, low deflections, especially deflections on the order of magnitude of a millimeter, suffice to achieve a measurable effect on the measured pressure. Yet, the influence of the membrane deflection on the measured flow is small.

In accordance with the invention, the flow measuring arrangement additionally features an apparatus 23 for the production of a deflection of the membrane 17. The deflection varies with time, according to a predetermined time-dependent deflection profile.

Figure 2:
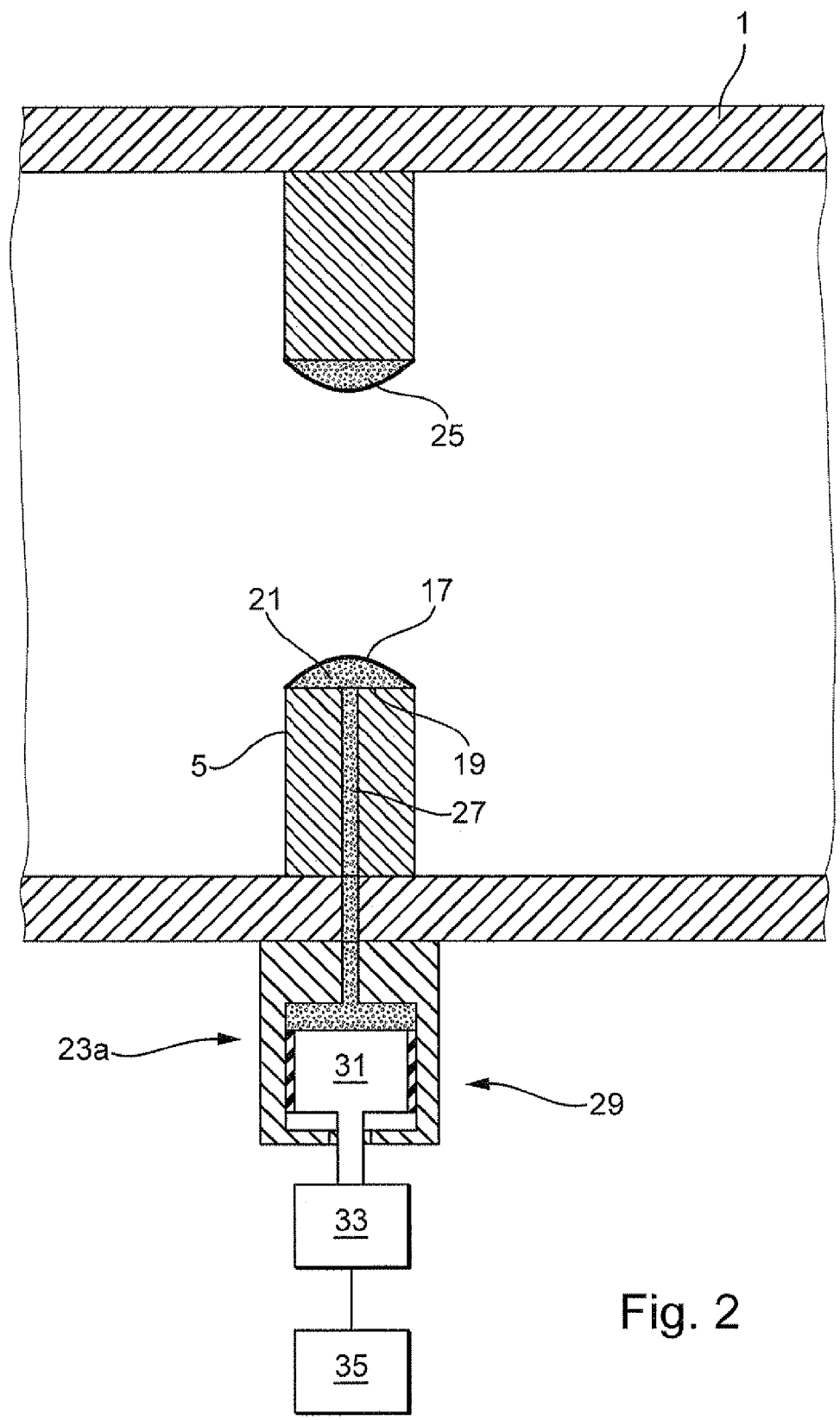
FIG. 2 shows a diaphragm with a membrane applied thereto and a hydraulic apparatus connected for deflection of the membrane.
Figure 3:
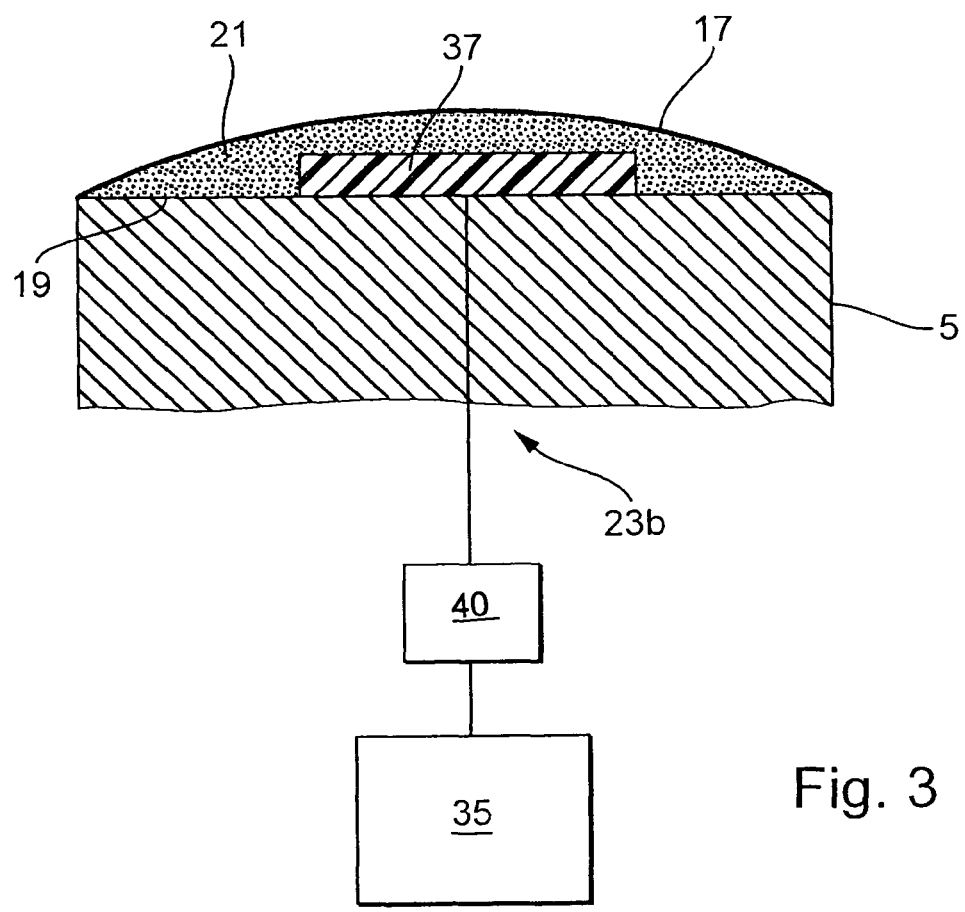
FIG. 3 shows a diaphragm with a membrane applied and a piezoelectric apparatus connected thereto for deflection of the membrane.
Figure 4:
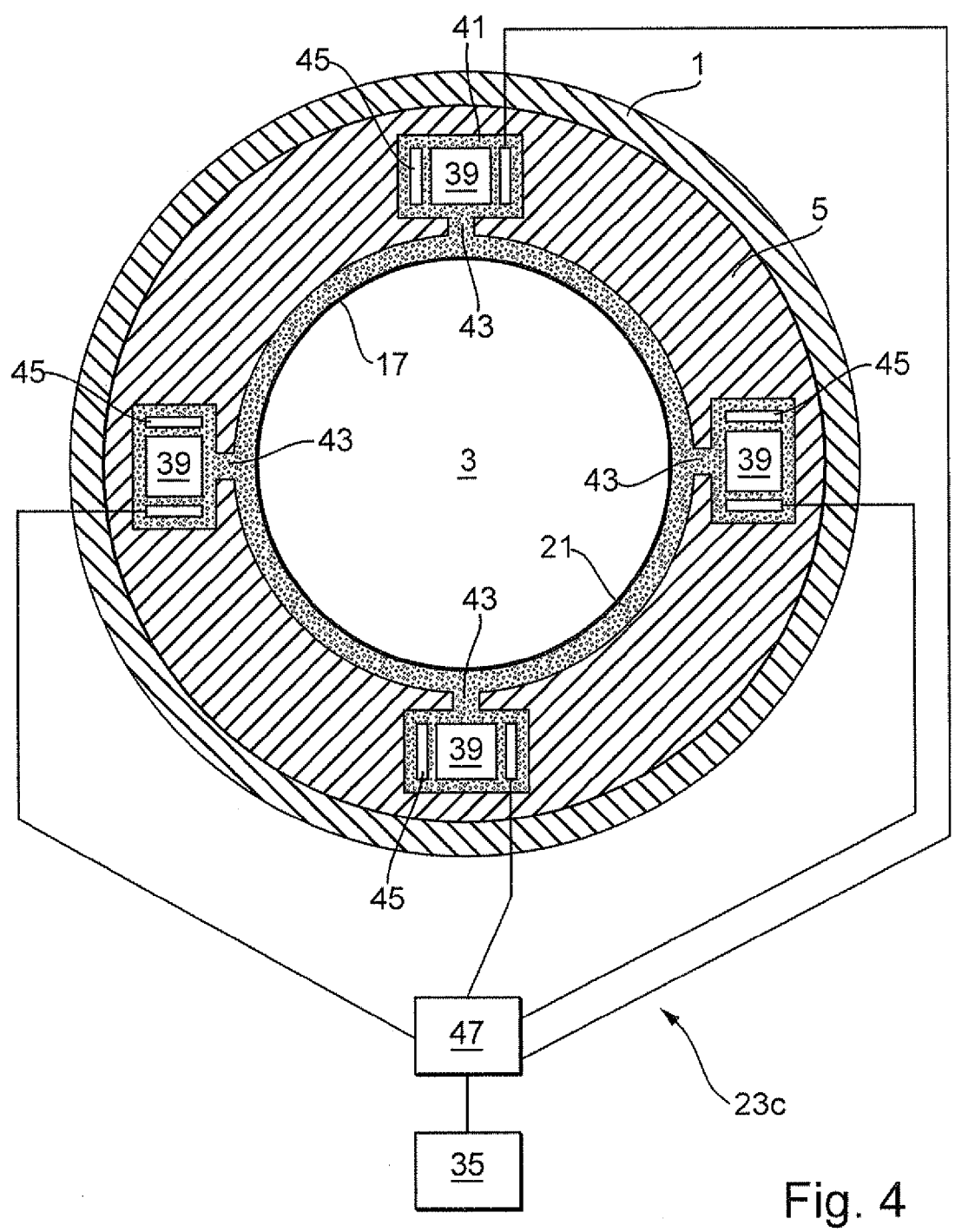
FIG. 4 shows a diaphragm with a membrane applied and a magnetostrictive apparatus connected thereto for deflection of the membrane.

FIGS. 2 to 4 present three variants for this.

FIG. 2 shows a cross section of the diaphragm 5 and a first variant of such an apparatus 23a connected thereto.

Here, the chamber 21 is filled with an incompressible medium 25, e.g. a silicone oil. The apparatus 23a is a hydraulic apparatus, which effects deflection of the membrane 17 via supply, or removal, as the case may be, of the medium 25. Apparatus 23a includes a hydraulic line 27 extending through the diaphragm 5 into the chamber 21. Connected to line 27 is, for example, a hydraulic cylinder 29 containing a piston 31. Line 27 and the hydraulic cylinder 29 are likewise filled with the medium 25 and the volume of the medium 25 in the interior of the chamber 21 is set via the position of the piston 31. Piston 31 is driven by an actuator motor 33 connected thereto.

Apparatus 23 is connected to a control 35 which activates the apparatus 23 in such a manner that the membrane 17 executes deflections with time according to the predetermined time-dependent deflection profile. In the case of the variant illustrated in FIG. 2, this happens via a corresponding operation of the actuator motor 33.

Alternatively, the apparatus 23 for producing the variable deflection of the membrane 17 over time can be an electromechanical apparatus. Two variants of this arrangement are presented in FIGS. 3 and 4. In both variants, the constriction 3 is realized by the diaphragm 5, as shown in FIG. 1, where the membrane 17 is arranged on the inner lateral surface 19 for enclosing the chamber 21 filled with the medium 25.

The apparatus 23b illustrated in FIG. 3 includes, arranged in the chamber 21, at least one fill element 37 having an electrically adjustable fill element volume. Instead of a fill element 37, a number of fill elements 37 can be distributed uniformly on the inner lateral surface 19 of the diaphragm 5. Th fill elements 37 are, for example, as shown in FIG. 3, one or more piezoelectric elements e.g. assembled in a stack. The volume of the elements is adjustable via voltage applied respectively thereto. The respective voltages are provided via an on-site electronics 40, which is connected both to the piezoelectric elements as well as to the correspondingly embodied control 35 for setting the desired deflection of the membrane 17.

Alternatively, the one or more fill elements 39 can naturally be arranged, as shown in FIG. 4, in correspondingly many hollow spaces 41 filled by medium 25. Each hollow space 41 is connected to the chamber 21 via a conduit 43 likewise filled with medium 25.

In the sectional drawing illustrated here, four fill elements 39 are arranged uniformly distributed in hollow spaces 41 integrated in the diaphragm 5. The fill elements 39 are, in this case, magnetostrictive elements. Each is arranged in a coaxially surrounding, cylindrical coil 45. The volume of a fill element 39 is adjustable via the electrical current flowing through its particular cylindrical coil 45. The electrical current for adjusting the deflection of a membrane 17 is provided via an on-site electronics 47 connected to the correspondingly embodied control 35.

Figure 5:
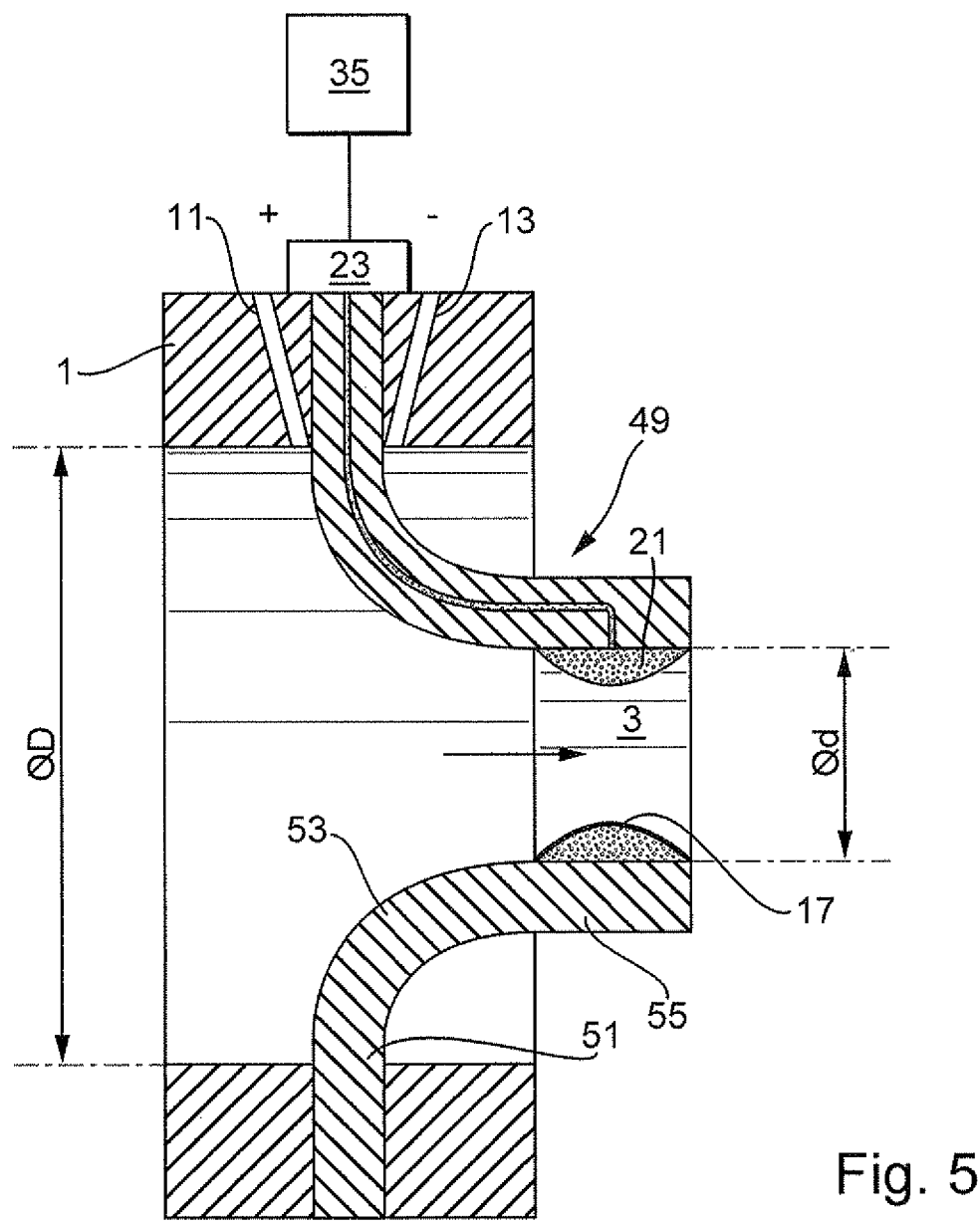
FIG. 5 shows a nozzle with a membrane applied thereon.

FIG. 5 shows a further variant of the flow measuring arrangement illustrated in FIG. 1 using the differential pressure method. Here, the constriction 3 includes a nozzle 49 inserted into the measuring tube 1. Nozzle 49 includes an annular, washer-shaped segment 51 inserted into the measuring tube 1 and extending radially inwardly into the measuring tube 1. Attached to segment 51 via a funnel shaped transition piece 53, which tapers narrower continuously in the direction of the flow, is a tubular segment 55. The tubular segment 55 has an inner diameter d, which is smaller than the diameter D of the measuring tube 1.

In this case, the membrane 17 is arranged on an inner, cylindrical, lateral surface of the tubular segment 55 and encloses a chamber 21 filled with a medium 25.

Analogously to the earlier described examples of embodiments, also here, an apparatus 23 is provided, as drawn only schematically in FIG. 5, for producing the variable deflection of the membrane 17 according to a predetermined time-dependent deflection profile. This apparatus can be, for example, a hydraulic apparatus according to the apparatus 23a illustrated in FIG. 2, or an electromechanical apparatus, in accordance with the apparatus 23b illustrated in FIG. 3 or the apparatus 23c illustrated in FIG. 4, to which is connected to a correspondingly embodied control 35.

Figure 6:
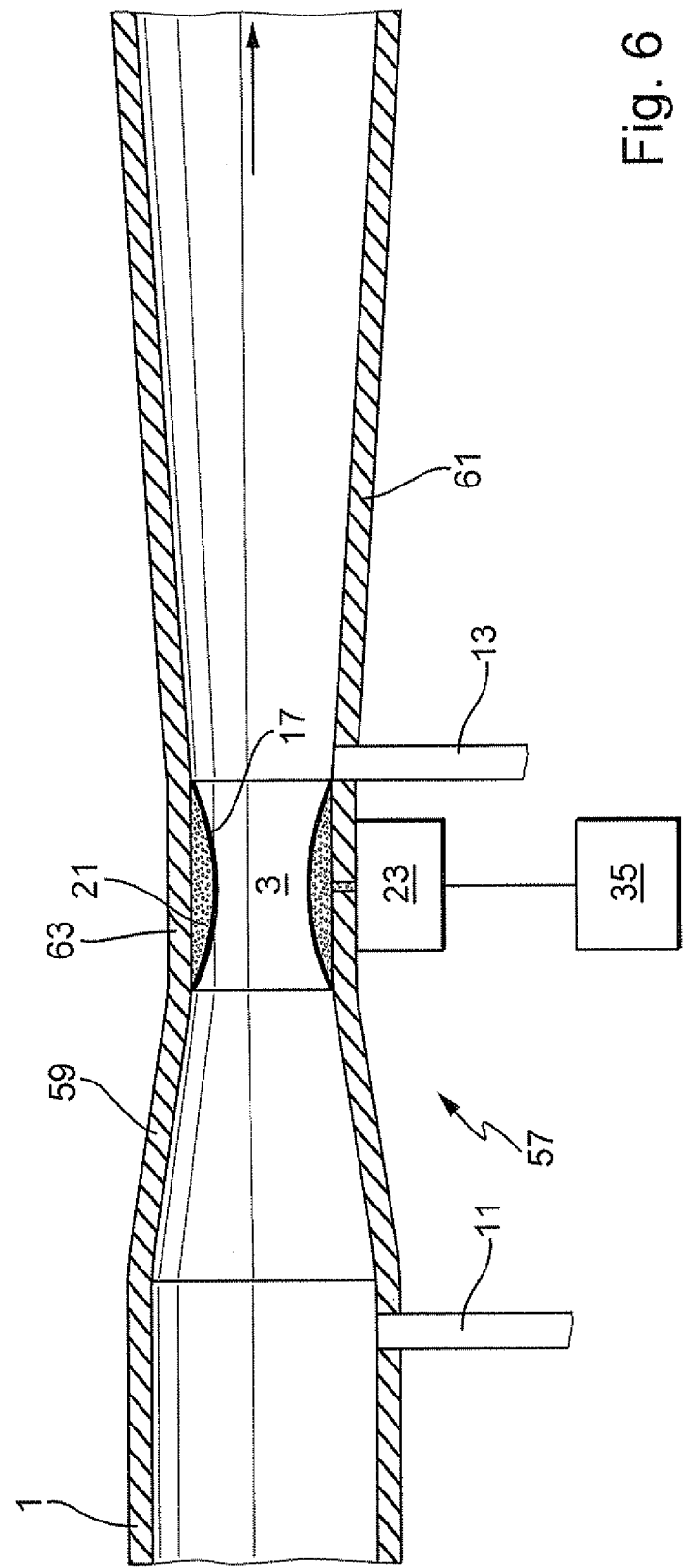
FIG. 6 shows a Venturi tube having a tubular section, on whose inner lateral surface a membrane is applied.

FIG. 6 shows a section of an additional variant of the flow measuring arrangement as illustrated in FIG. 1 using the differential pressure method. Here, the constriction 3 is a Venturi tube 57 interposed in the measuring tube 1. The inlet side of the Venturi tube has a funnel shaped, tapering tube section 59 and the outlet side a diffuser 61. In-between, a tubular section 63 is arranged, which has a reduced diameter compared to the measuring tube diameter and therewith forms the constriction 3.

The membrane 17 is likewise here arranged on an inner, cylindrical, lateral surface of the section 63 and encloses the chamber 21 filled with medium 25.

Analogously to the earlier described examples of embodiments, also here, an apparatus 23, only schematically drawn in FIG. 6, is shown for producing a time variable deflection of the membrane 17 according to a predetermined time-dependent deflection profile. This apparatus can be, for example, a hydraulic apparatus in accordance with the apparatus 23a illustrated in FIG. 2, or an electromechanical apparatus in accordance with the apparatus 23b illustrated in FIG. 3 or in accordance with the apparatus 23c illustrated in FIG. 4, which is connected to a correspondingly embodied control 35.

Figure 7:
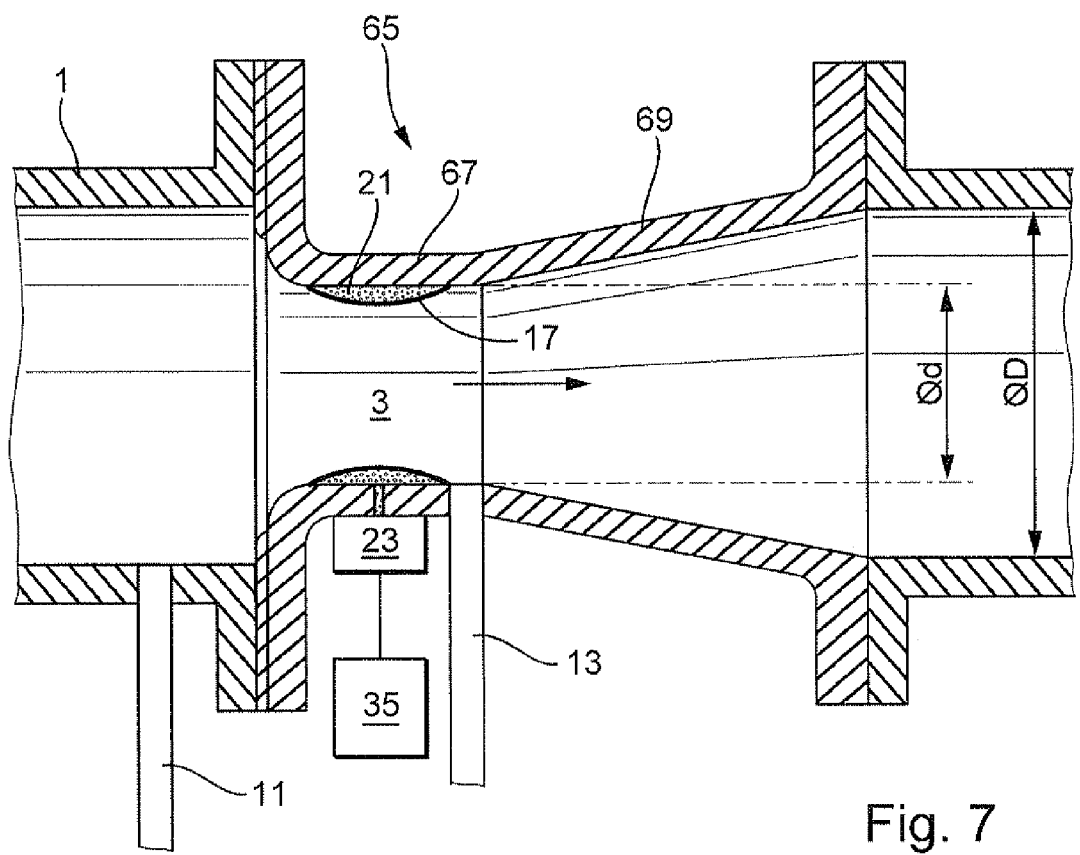
FIG. 7 shows a Venturi nozzle having a tubular section, on whose inner lateral surface a membrane is applied.

FIG. 7 shows a cross section of an additional variant of the flow measuring arrangement as illustrated in FIG. 1 using the differential pressure method. Here the constriction 3 is formed by a Venturi nozzle interposed in the measuring tube 1. This Venturi nozzle has a tubular section 67 having a reduced diameter d compared to the measuring tube diameter D and therewith forms the constriction 3. Also here a diffuser 69 forms the outlet of the tubular section 67.

Membrane 17 is likewise here arranged on an inner, cylindrical, lateral surface of the tubular section 67 and encloses the chamber 21 filled with the medium 25. Also here, exactly as in the example of an embodiment illustrated in FIG. 6, an apparatus 23 is provided for producing a time variable deflection of the membrane 17 in accordance with a predetermined time-dependent deflection profile.

Figure 8:
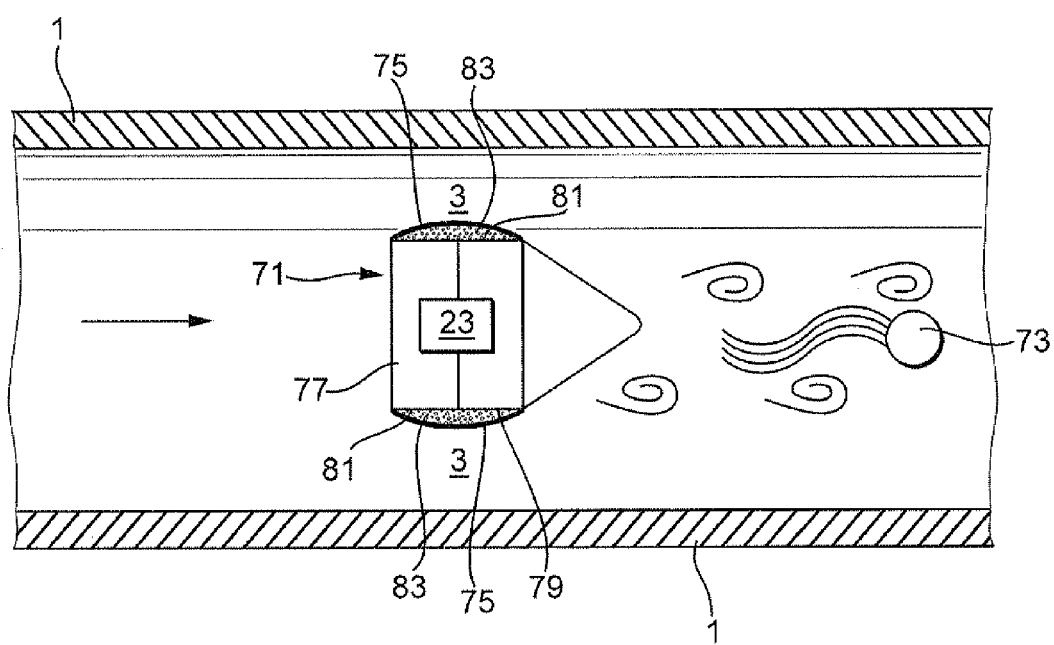
FIG. 8 is a schematic representation of a flow measuring arrangement of the invention working according to the vortex method.

FIG. 8 shows a plan view of a vortex flow measuring arrangement in accordance with the invention. Also here, there is a constriction 3 in the measuring tube 1 for effecting a reduction of the volume through which the medium flows internally in the measuring tube 1. The constriction 3 here is formed by a bluff body 71 installed in the measuring tube 1. The medium flows around the bluff body. Vortices are shed from the bluff body and move downstream of the bluff body. These vortices are shed with a frequency f dependent on the dimensions of the bluff body 71 and dependent on the flow. The vortices effect pressure fluctuations downstream of the bluff body 71 in the measuring tube 1. These pressure fluctuations are registered by a pressure measuring transducer 73 (here only schematically shown), which measures, at a measuring location situated, in the flow direction, behind the bluff body 71, the pressure p(t) acting in the measuring tube 1 and varying, as a function of time, depending on the flow vortices flowing past. The measured pressure p(t) depends on the dimensions of the bluff body 71 and on the flow. The frequency f of the shedding of the vortices is reflected in the frequency f of the changes of the measured pressure p(t) as a function of time. Also provided here is a measuring electronics, not shown in FIG. 8, which determines flow on the basis of the measured pressure p(t) and the dimensions of the bluff body 71.

The pressure measuring transducer 73 applied here can be a classic transducer that directly measures the pressure p(t), but also other measuring transducers already in use today in vortex flow measuring systems can be used. An example of this are capacitive measuring transducers, which typically have a paddle-shaped sensor blade, whose one end protrudes into the measuring tube 1 behind the bluff body 71 and is moved to and fro perpendicularly to the longitudinal axis of the measuring tube by the pressure fluctuations caused by the shedding of the flow vortices. The opposite end of the sensor blade correspondingly executes equal and opposite movements and forms an electrode of one or more capacitors. The movements of the electrode are measured by a measuring electronics connected to the capacitors in the form of capacitance changes proportional to the vortex pressure difference.

In accordance with the invention, also here, there is provided on the constriction 3 in the interior of the measuring tube 1 at least one membrane 75, which is deflectable into the measuring tube 1. This deflection effects, as a function of its amplitude, a change of the volume through which the medium flows internally in the measuring tube 1.

In the illustrated example of an embodiment, the bluff body 71 includes a member 77 installed in the measuring tube 1. Member 77 has a rectangular cross section as seen in the plan view, on whose rear side, as seen in the direction of flow, over the complete length, a wedge-shaped element 79 is formed. Element 79 ends in a point.

Fundamentally, the deflections of one deflectable membrane 75 applied to the bluff body 71 suffices to effect measurable changes in the measured pressure p(t). Preferably, however, for purposes of symmetry, two identically embodied membranes 75 are provided, which are applied lying opposite each other on the outer side surfaces 81 of the bluff body 71 facing perpendicularly to the direction of the flow. The membranes 75 are fixedly connected at their closed outer edges to the respective lateral surfaces 81 of the bluff body 71.

Under the membranes 75, there is, in each case, an enclosed chamber 83 filled with the incompressible medium, and for each membrane 75 there is an apparatus 23 for producing time variable deflections of the membrane 75 according to a predetermined time-dependent deflection profile. Each apparatus, exactly as in the case of the preceding examples of embodiments, is operated by a corresponding control 35, which is not shown here. The apparatuses 23a, 23b, and 23c described earlier are especially suitable for this. With the symmetric form of embodiment illustrated here, the two membranes 75 are preferably deflected synchronously. One apparatus 23 operated by the control 35 and connected to the two membranes 75 is sufficient for this.

Also here, extremely small deflections of the membranes 75, especially deflections on the order of magnitude of a millimeter, suffice to achieve a measurable effect on the measured pressure p(t). In turn, the influence of the deflection of the membranes on the flow is insignificant.

In accordance with the invention, all flow measuring systems described feature, in each case, a diagnostic system 85, which serves to monitor the functional ability of its flow measuring system. The diagnostic systems 85 can be embodied as separate units or they can be a component of the measuring electronics 15 of the flow measuring transducer.

The diagnostic system 85 is connected via the control 35 to the apparatus 23 for producing the time variable deflection of the membrane 17, or the two membranes 75, as the case may be, and to the pressure measuring system 7, thus to the pressure difference transducer 9, or, as the case may be, to the pressure transducer 73, and to the measuring electronics 15.

For monitoring the functional ability of the flow measuring system, the membrane 17, or, as the case may be, the membranes 75, is/are actuated to execute time variable deflections according to a predetermined time-dependent deflection profile. This procedure is preferably initiated automatically by the diagnostic system 85 and carried out via the control 35 and the apparatus 23. This can, depending on choice of the predetermined time-dependent deflection profile, occur sporadically, regularly, or based on need, for a predetermined period of time, or even permanently.

In this way, via the predetermined time-dependent deflection profile, directly at the beginning of the total measuring chain, namely at the constriction 3, a known signal is actively fed in, which is transmitted through the entire measuring chain from the constriction 3 through to the output of the pressure measuring system 7.

This permits monitoring of the entire measuring chain. As soon as the signal fed in at the beginning of the measuring chain can no longer be detected at the output of the measuring chain, an error exists within the measuring chain. Typical errors are e.g. slow plugging of the pressure supply lines as well as mechanical and/or electronic malfunctions of the pressure measuring systems.

The diagnostic system 85 determines, from the measured pressure $\Delta p$, or p(t), at least one effect of the changes, with respect to time, of the deflection of the membrane 17, or the membranes 75, on the measured pressure $\Delta p$, or p(t), and creates a diagnosis of the functional ability of the flow measuring arrangement based on the predetermined time-dependent deflection profile and the effects, as determined by the diagnostic system, of the associated changes of the membrane deflection over time. In such case, it is already sufficient, if the signal fed in can be detected at the output of the measuring chain on the basis of the effects. This is especially the case, when the output signal of the measuring chain, i.e., the measured pressure $\Delta p$, or p(t), reflects the time-dependence of the time-dependent deflection profile. If this is the case, the flow measuring system is working properly. If this is not the case, an error within the measuring chain is diagnosed.

However, it is preferable, instead of, or in addition to, this detection, to perform a comparison where the diagnostic system 85 compares the effects it has determined with corresponding reference effects of a properly functioning flow measuring arrangement. The reference effects for this are previously ascertained in corresponding reference measurements and stored in a memory assigned to the diagnostic system 85. On the basis of this comparison, the diagnostic system 85 creates a diagnosis of the functional ability of the flow measuring arrangement.

Diagnostic methods performed with measuring arrangements of the invention will now be described first based on the example of pressure measuring transducers working according to the differential pressure method—thus, pressure measuring transducers as described, for example, in FIGS. 1 to 7.

In a first variant, the time-dependent deflection profile is an oscillation of the membrane 17 with a predetermined oscillation amplitude $A_M$ and a predetermined frequency $f_M$. Frequency $f_M$ is preferably large compared to the rate of change of flow in the measuring tube 1 so that the flow and also the flow-dependent components of the measured differential pressure $\Delta p$ can be seen as constant during the duration of one or more oscillation periods. For this, as a rule, frequencies $f_M$ on the order of magnitude of 10 Hz are sufficient.

While the membrane 17 oscillates, the diagnostic system 85 determines at least one effect of the oscillation of the membrane on the measured differential pressure $\Delta p$. Counted among such effects are, especially, amplitude, phase shift vis-à-vis the oscillation of the membrane 17, and/or the frequency of the changes of the measured differential pressure $\Delta p$ caused by the oscillation of the membrane.

The diagnostic system 85 performs a comparison of these effects with corresponding reference effects in the case of a properly functioning flow measuring arrangement, and, on the basis of these comparisons, creates a diagnosis of the functional ability of the flow measuring arrangement.

For this, it is preferable that a quantitative deviation between the respective effect and the associated reference effect is determined. The diagnosis is preferably issued graded on the degree of deviation as a report of full functional ability, a small degrading of the functional ability, a warning; an error report or an alarm.

Since membrane oscillations fast in comparison to the rate of change of flow are performable with flow measuring arrangements of the invention, and, additionally, low amplitudes, on the order of magnitude of a millimeter, in the oscillation of the membrane suffice in order to achieve measurable changes of the differential pressure $\Delta p$, flow measurement can be continued practically unimpeded during the total duration of the performance of the diagnostic method. In this case, the flow measurement is preferably determined via an average value of the measured differential pressure $\Delta p$ averaged over one or more periods of the oscillation of the membrane.

The diagnostic method described above for the differential pressure method is applicable, in an analogous form, in connection with flow measuring transducers of the invention using the vortex method. In such case, the diagnostic system 85 effects via the control 35 and the apparatus 23a synchronous deflection of the two membranes 75 according to the predetermined time-dependent deflection profile. For this, an oscillation frequency $f_M$ is preferably used, which is large compared to the rate of change of flow through the measuring tube 1, and clearly greater than the frequencies with which the vortices dependent on flow are shedded.

If the membranes 75 are excited to oscillations with such a clearly greater frequency, then the measured pressure p(t) shows lower frequency pressure fluctuations with the frequency of the vortex shedding, on which are superimposed the clearly lower amplitude, higher frequency pressure fluctuations attributable to the oscillation of the membrane. Through a corresponding interpretation of the signal of the measured pressure p(t), for example, amplitude, phase and/or frequency of the superimposed higher frequency pressure fluctuations can be measured as effects of the oscillation of the membrane, and can be compared with corresponding reference effects for the creation of the diagnosis. Parallel thereto, flow is determined based on the frequency of the low frequency, pressure fluctuations.

The invention claimed is:

1. A flow measuring arrangement for measuring flow of a medium through a measuring tube, comprising:
   at least one constriction located in the measuring tube which effects a reduction of a volume through which the medium flows internally in the measuring tube, and therewith a change in pressure conditions internally in the measuring tube, dependent on dimensions of said at least one constriction and dependent on flow;
   a pressure measuring system connected to the measuring tube which serves to measure a pressure ($\Delta p$, p) dependent on flow through the measuring tube and dependent on the dimensions of said at least one constriction;
   measuring electronics, which determines flow based on measured pressure ($\Delta p$, p) and the dimensions of said at least one constriction;
   at least one deflectable membrane applied to one of the measuring tube constrictions internally in the measuring tube, wherein deflection of said at least one deflectable membrane effects a change, dependent on an amplitude of the deflection, of a volume through which medium flows internally in the measuring tube;
   an apparatus for producing a time variable deflection of said at least one deflectable membrane according to a predetermined time-dependent deflection profile; and,
   a diagnostic system connected to said apparatus and to said pressure measuring system, which determines at least one effect of time-dependent changes of deflection of said at least one deflectable membrane on the measured pressure ($\Delta p$, p), and which produces a diagnosis of the functional ability of the flow measuring arrangement based on the predetermined time-dependent deflection profile and effects, as determined by the diagnostic system, of associated time-dependent changes of the deflection of said deflectable membrane on the measured pressure ($\Delta p$, p).

2. The flow measuring arrangement as claimed in claim 1, wherein:
   the measured pressure ($\Delta p$) is a differential pressure, which, in the direction of the flow, equals the difference between the static pressure ($p_{st1}$) reigning in the measuring tube before said at least one constriction and the static pressure ($p_{st2}$) reigning in the measuring tube after said at least one constriction; and,
   for measuring differential pressure ($\Delta p$), said pressure measuring system is a pressure difference transducer, to which the pressure ($p_{st1}$) reigning before said at least one constriction is fed via a pressure supply line connected to the measuring tube before said at least one constriction; and to which the pressure ($p_{st2}$) reigning after said at least one constriction is fed via a pressure supply line connected to the measuring tube after said at least one constriction.

3. The flow measuring arrangement as claimed in claim 2, wherein:
   said at least one constriction is formed by, inserted into the measuring tube, a diaphragm, on whose lateral surface facing inwardly into the measuring tube, said deflectable membrane is applied.

4. The flow measuring arrangement as claimed in claim 2, wherein:
   said at least one constriction is formed by, inserted into the measuring tube, a diaphragm, which has a plurality of openings; and
   said at least one deflectable membrane is applied to at least one inner, lateral surface of one of said plurality of openings.

5. The flow measuring arrangement as claimed in claim 2, wherein:
   said at least one constriction is formed by, inserted into the measuring tube, a nozzle, which has, located in the measuring tube, a tubular segment, whose diameter is smaller than the diameter of the measuring tube; and
   said at least one deflectable membrane is arranged on an inner lateral surface of said tubular segment.

6. The flow measuring arrangement as claimed in claim 2, wherein:
   the measuring tube has a tube segment in the form of a Venturi tube or a Venturi nozzle; and
   said at least one constriction is formed by a section of this tube segment having a reduced diameter compared to the measuring tube diameter.

7. The flow measuring arrangement as claimed in claim 1, wherein:
   said at least one constriction is formed by a bluff body inserted into the measuring tube, medium flows around said bluff body, and flow vortices are shed behind said bluff body with a frequency dependent on the dimensions of said bluff body and dependent on the flow;
   said pressure measuring system includes a pressure measuring transducer located downstream of said bluff body, in the direction of flow,
   which measures a pressure (p(t)), which acts at a location in the measuring tube, in the direction of flow, behind said bluff body and varies with time as a function of flow vortices that flow by;
   said measuring electronics determines flow on the basis of the time-dependent, measured pressure (p(t)); and
   said deflectable membrane is applied to an outer lateral surface of said bluff body.

8. The flow measuring arrangement as claimed in claim 7, wherein:
   said pressure measuring transducer is a capacitive measuring transducer, which has a paddle-shaped sensor blade, whose one end protrudes into the measuring tube behind said bluff body and is moved to and fro perpendicularly to the measuring tube longitudinal axis by pressure fluctuations caused by the flow vortices, and whose end lying opposite to the one end executes opposite equal movements and forms an electrode of one or more capacitors; and
   which has, connected to the capacitors, measuring electronics, which measures the movements of the electrode in the form of capacitance changes proportional to the vortex pressure difference.

9. The flow measuring arrangement as claimed in claim 7, wherein:
   said bluff body comprises two, oppositely lying, outer, lateral surfaces, wherein each of said two outer, lateral surfaces has one of said deflectable membranes applied thereto.

10. The flow measuring arrangement as claimed in claim 1, wherein:
    a chamber filled with an incompressible medium is located beneath said deflectable membrane; and
    said apparatus is a hydraulic apparatus connected to said chamber for effecting the deflection of said deflectable membrane via supply, or removal, of the incompressible medium.

11. The flow measuring arrangement as claimed in claim 1, wherein:
    a chamber filled with an incompressible medium is located beneath said deflectable membrane; and said apparatus comprises a fill element arranged in said chamber or in a hollow space connected to said chamber and having an electrically adjustable fill element volume; the fill element is a piezoelectric or magnetostrictive element.

12. A method for monitoring functioning of a flow measuring system comprising:
at least one constriction located in the measuring tube which effects a reduction of a volume through which the medium flows internally in the measuring tube, and therewith a change in pressure conditions internally in the measuring tube, dependent on dimensions of said at least one constriction and dependent on flow;
a pressure measuring system connected to the measuring tube which serves to measure a pressure ($\Delta p$, p) dependent on flow through the measuring tube and dependent on the dimensions of said at least one constriction;
measuring electronics, which determines flow based on measured pressure ($\Delta p$, p) and the dimensions of said at least one constriction;
at least one deflectable membrane applied to one of the measuring tube constrictions internally in the measuring tube, wherein deflection of said at least one deflectable membrane effects a change, dependent on an amplitude of the deflection, of a volume through which medium flows internally in the measuring tube;
an apparatus for producing a time variable deflection of said at least one deflectable membrane according to a predetermined time-dependent deflection profile; and,
a diagnostic system connected to said apparatus and to said pressure measuring system, which determines at least one effect on the measured pressure ($\Delta p$, p) caused by time-dependent changes of deflection of said at least one deflectable membrane, and which produces a diagnosis of the functional ability of the flow measuring arrangement based on the predetermined time-dependent deflection profile and effects, on the measured pressure ($\Delta p$, p), caused by associated time-dependent changes of the deflection of said deflectable membrane, the method comprising the steps of:
comparing via said diagnostic system said determined effects on measured pressure ($\Delta p$, p), caused by time changes of deflection of said deflectable membrane, with corresponding reference effects occurring in a flow measuring arrangement working properly in the case of the same predetermined deflection profile; and,
on the basis of this comparison, create a diagnosis of functional ability of the flow measuring arrangement.

13. The method for monitoring functioning of a flow measuring system as defined in claim 12, wherein:
the apparatus sporadically, regularly, need dependently or permanently causes said at least one deflectable membrane to oscillate with a frequency large compared to rate of change of flow;
the diagnostic system determines at least one effect on measured pressure ($\Delta p$) brought about by said oscillations of said at least one deflectable membrane caused by said apparatus;
the diagnostic system compares said at least one effect on measured pressure with corresponding reference effects occurring in a properly working flow measuring arrangement; and,
the diagnostic system, on the basis of this comparing, creates a diagnosis of the functional ability of the flow measuring system.

14. The method as claimed in claim 13, wherein:
flow through the measuring tube is determined, while said deflectable membrane oscillates, from an average value of measured pressure ($\Delta p$) averaged over at least one period of the oscillation of said deflectable membrane.

15. The method for monitoring functioning of a flow measuring system as defined in claim 12, wherein:
the apparatus sporadically, regularly, need dependently or permanently causes said at least one deflectable membrane to oscillate with a frequency large compared to rate of change of flow and large compared to frequency of shedding of vortices to behind the bluff body;
the diagnostic system determines at least one effect on measured pressure (p(t)) brought about by oscillations of said at least one deflectable membrane;
comparing the effects with corresponding reference effects occurring in a properly working flow measuring arrangement; and,
on the basis of this comparing, creates a diagnosis of the functional ability of the flow measuring system.

16. The method as claimed in claim 12, wherein:
in given cases, deviations from the reference effects are determined; and
the diagnosis is reported, depending on degree of the deviations, as full functional ability, a small degradation, a warning, an error report or an alarm.

17. The method as claimed in claim 12, wherein:
the effects are an amplitude of measured pressure, a phase shift of an oscillation of measured pressure relative to the oscillation of said deflectable membrane, and/or a frequency of the changes of measured pressure ($\Delta p$, p(t)) resulting from oscillations of said deflectable membrane.

* * * * *